J. W. PRICE.
WHEAT-STEAMERS.
No. 184,298. Patented Nov. 14, 1876.
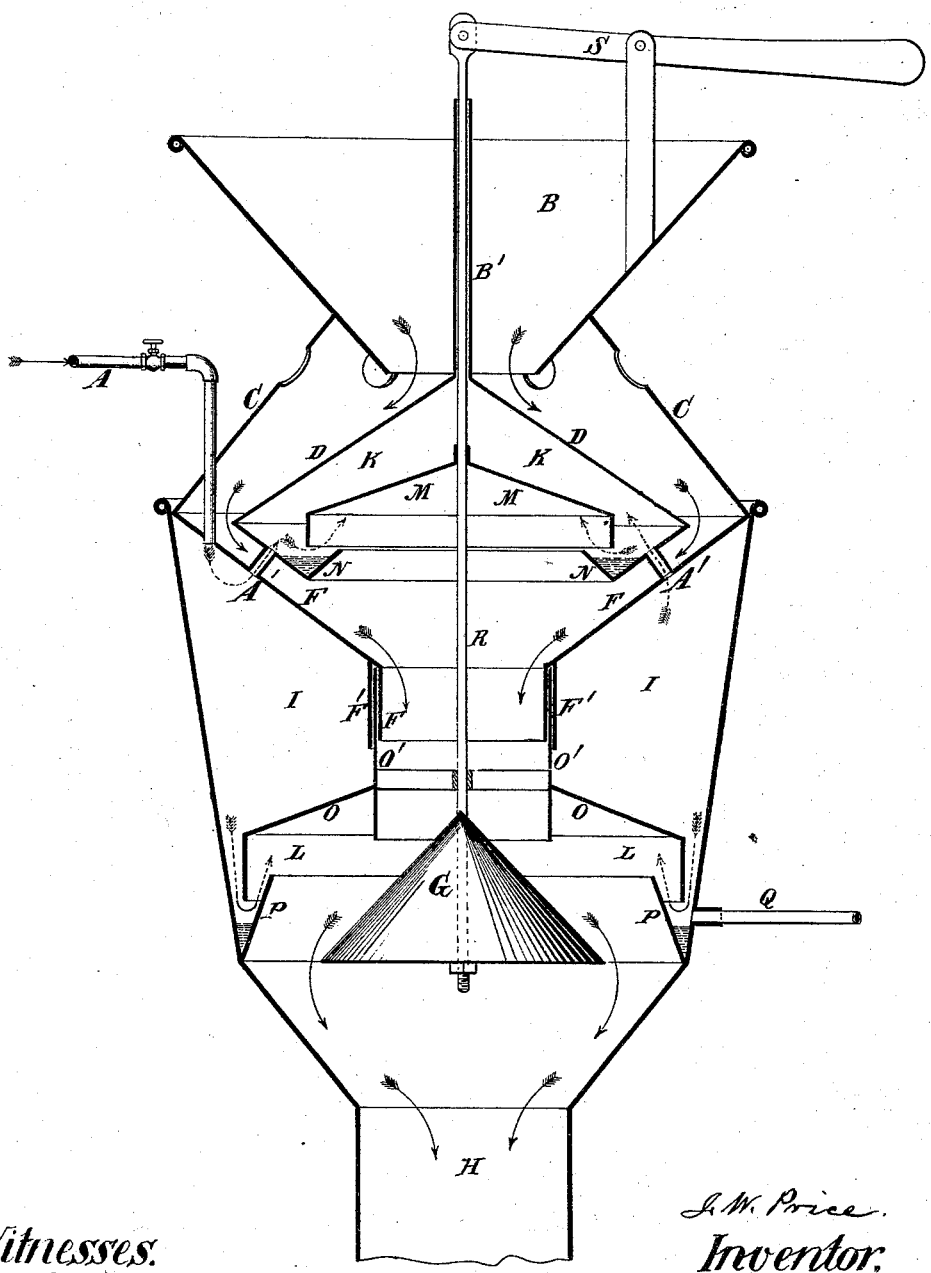
Witnesses.
A. Ruppert
W. P. Banes
Inventor.
J. W. Price
D. P. Holloway & Co
Attys

UNITED STATES PATENT OFFICE.

JAMES W. PRICE, OF MICHIGANTOWN, INDIANA.

IMPROVEMENT IN WHEAT-STEAMERS.

Specification forming part of Letters Patent No. 184,298, dated November 14, 1876; application filed August 18, 1876.

*To all whom it may concern:*

Be it known that I, JAMES W. PRICE, of Michigantown, in the county of Clinton and State of Indiana, have invented a new and useful Apparatus for Drying or Moistening Wheat by Steam, of which the following is a specification:

The object of this machine is to prepare wheat for grinding according to its condition—if too dry it may be moistened, if too damp it may be dried, or it may be warmed in very cold weather. The features of the apparatus will be made clear by the following description and claims.

In the annexed drawings I have shown the apparatus in a vertical section, made upon a scale of about one-half. The apparatus is intended to be suspended between the stock-hopper and the hopper on the stones, so that the grain may be prepared for grinding as it is used. Steam may be supplied by means of a small steam-generator connected with the steam-pipe A, leading into the interior of the apparatus. B is a hopper, into which the wheat or other grain is run from the stock-hopper, passing thence, as indicated by the black arrows, onto the conical diaphragm D, and passing down between it and the perforated shell C onto the funnel-formed plate F, and thence down onto the cone G and out through the pipe H to the stones. In its downward passage from cone D to funnel F, it will be observed that the wheat is turned over—that is, the grains which were on top in descending D will be at the bottom in descending F, and vice versa.

Steam entering through pipe A fills the chamber I, and passes through short pipes A' into the chamber K, thus heating the grain as it passes over the plates D and F. It may be discharged at once into the stones, if the object is only to dry or warm the grain. In its exit it passes through the chamber L, being further heated by heat transmitted through plate O. The lower part of chamber K is formed by a hood, M, terminating below with a vertical flange, which fits into the angle N. In like manner the top of chamber L is formed by the hood O, connected with a tube, O', forming, with the double plates at the tubular termination F' of the funnel F, a slip-joint, and terminating below with a vertical flange, which fits into the angle P, from which a drip-pipe, Q, is extended. The hoods M and O, as well as the cone G, are fastened to a rod, R, passing through the middle of the machine, and actuated in raising or lowering by the lever S. The rod in passing through hopper B is inclosed in a tube, B'.

The apparatus is operated as follows: The admission of steam is regulated by a stopcock in pipe A. It at all times fills the steam-chambers I and K. If the object is merely to dry the wheat or warm it, the rod R is lowered, bringing the flanges of hoods M and O into the angles N and P, filled with water of condensation, and cutting off communication between the steam-chambers I and K, and the wheat passing down through the interior of the apparatus. Should, however, the purpose be to moisten the wheat, the rod R should be raised, elevating the flanges of the hoods above the water in the angles N and P, which cannot accumulate beyond the pipes A' and Q, and leaving an open communication for the steam to flow under the flanges into the interior of the apparatus, as indicated by the dotted arrows, where, mingling with the wheat, it is condensed and moistens it. It then passes to the stones to be ground. It will be observed that, in passing, the wheat is first dried, and then moistened. The steam is introduced at the bottom of the apparatus, in order that the wheat may not be dried after being moistened.

What I claim as my invention, and desire to secure by Letters Patent, is—

1. An apparatus for drying or dampening grain, combining in its construction heated plates D F, over which the wheat flows, exposed to the heat of steam in chambers I and K, and adjustable openings between such steam-chambers for drying the wheat without moistening it, or first drying and then moistening it at the will of the operator, substantially as set forth.

2. In combination with the steam and wheat chambers, the adjustable hoods and angles N and P, for holding water and admitting or shutting off steam to or from the wheat, substantially as set forth.

3. In combination with the steam and wheat chambers and water-angles N and P, the rod R, hoods M and O, and telescope-joint F' F' O' for controlling the communication between the steam and wheat chambers, substantially as set forth.

In testimony whereof I have signed my name to this specification in the presence of two subscribing witnesses.

JAMES W. PRICE.

Witnesses:
JAMES H. JOHNSTON,
THOS. J. RANDLES.